Nov. 2, 1937. R. J. KRATKY 2,097,983

PISTON AND ROD ASSEMBLY

Filed Oct. 12, 1936

Inventor
R. J. Kratky

WITNESS
H. Woodard

Patented Nov. 2, 1937

2,097,983

UNITED STATES PATENT OFFICE 2,097,983

PISTON AND ROD ASSEMBLY

Richard J. Kratky, Boise, Idaho

Application October 12, 1936, Serial No. 105,331

5 Claims. (Cl. 309—19)

The invention relates to a piston and rod assembly intended primarily for internal combustion engines, and it aims to provide a new and highly advantageous construction which will prevent piston slap and its consequent ills. Piston slap is due largely to so-called "cocking" of the piston in the cylinder but the present invention effectively stabilizes the piston against such "cocking" and thereby prevents slapping.

With the above object in view, the invention resides in the novel structure hereinafter described and claimed.

Fig. 1 of the accompanying drawing is a longitudinal sectional view through a cylinder, crank shaft, piston and piston pin, showing the connecting rod in elevation and illustrating the invention, the piston being shown on upper deadcenter.

Figure 1:
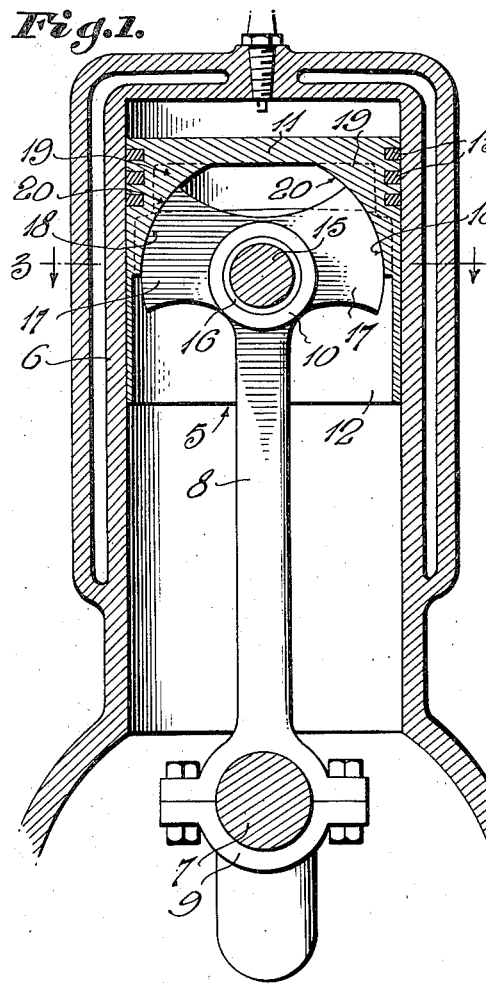

A preferred construction has been shown in the drawing and will be rather specifically described, with the understanding, however, that within the scope of the invention as claimed, variations may be made.

A piston 5 is shown within a conventional cylinder 6, said piston being connected with one of the usual crank pins 7, by means of a connecting rod 8, said rod having the usual connecting rod bearing 9 at one end and piston pin bearing 10 at its other end.

The piston 5 is provided with a head 11 and skirt 12, said head carrying appropriate rings 13. Piston pin bosses 14 are formed on the skirt 12, the piston pin bearing 10 is received between these bosses, and the piston pin 15 passes through said bearing 10 and bosses 14. The pin 15 may either be held in the bearing 10 and rockably received in the bosses 14, or vice-versa. In the present showing, the bearing 10 is provided with a bushing 16 to turn upon the pin.

The piston end of the rod 8 is provided with two arms 17 projecting in opposite directions therefrom in a plane at right angles to the piston pin axis, the outer ends of said arms 17 being provided with arcuate bearing surfaces 18 concentric with the piston pin and converging toward the piston head 11. The arms 17 are preferably integral with the rod and in the present showing said arms are integrally joined to the piston pin bearing 10 of said rod.

Bearing abutments 19 are secured to the piston 5, being preferably located in the angle between the head 11 and skirt 12, said abutments having arcuate bearing surfaces 20 which contact with the surfaces 18 of the arms 17. The abutments in the present showing are integrally joined both to the piston head 11 and to the skirt 12, providing an unusually strong structure.

Figure 2:
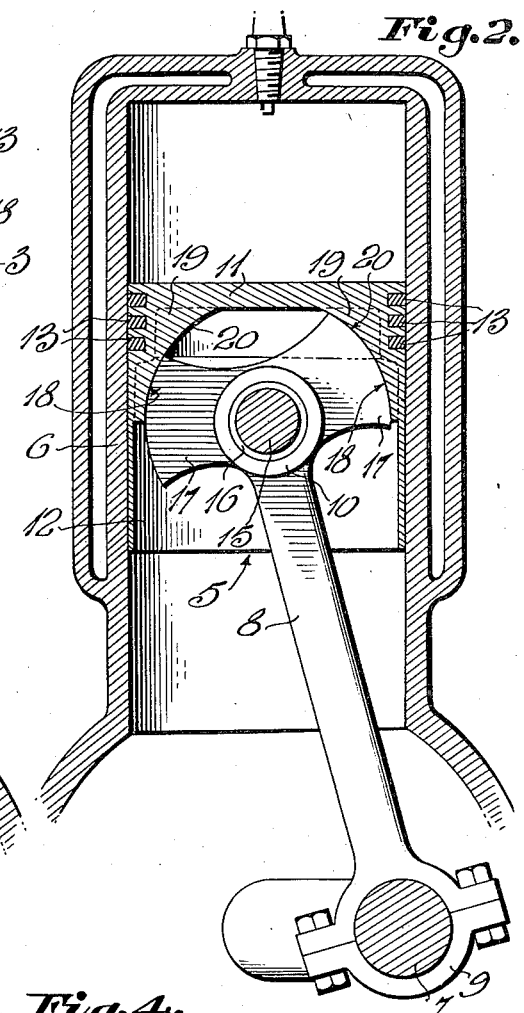
Fig. 2 is a view similar to Fig. 1 but showing the relation of parts when the crank has rotated 90° from the piston shown in Fig. 1.
Figure 3:
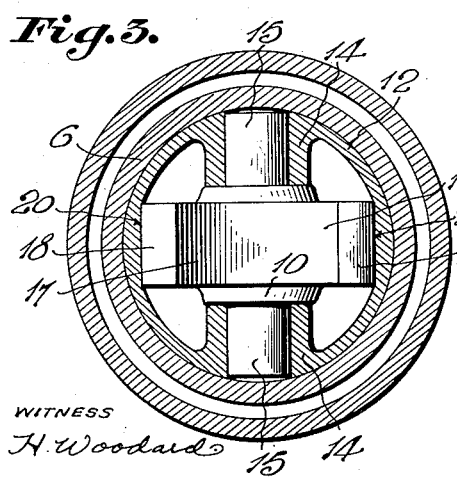
Fig. 3 is a transverse sectional view on line 3—3 of Fig. 1.
Figure 4:
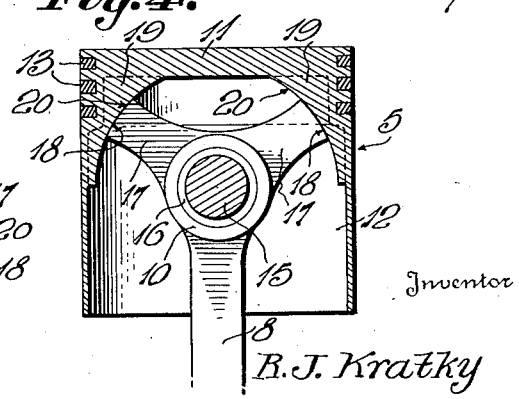
Fig. 4 is a detail view similar to a portion of Fig. 1 and showing a slightly modified construction.

The arms 17 may either be comparatively wide as shown in Figs. 1 and 2 or relatively narrow as in Fig. 4. In either case their principal contact with the surfaces 20 is above the axis of the wrist pin 15.

During operation, the bearing surfaces 18 of the arms 17 slide upon the surfaces 20 of the abutments 19 and do not therefore interfere with proper swinging of the connecting rod 8 upon the wrist pin 15, yet the contacting arms and abutments effectively stabilize the piston against "cocking" in the cylinder and therefore act to effectively prevent piston slap. Moreover during all strokes of the piston the contacting abutments and arms take a great deal of strain usually transmitted from piston to rod by the wrist pin alone, this being of particular advantage on compression and power strokes during which the piston pin is subjected to quite severe stresses. The piston pin, and rod and piston parts engaging said pin, being relieved of a great deal of strain, wear is reduced to the minimum. Moreover there is less danger of piston breakage due not only to the abutments 19 and arms 17 carrying part of the load, but to the effective reenforcing of the piston by means of said abutments.

From the foregoing it will be seen that a novel and advantageous structure has been provided for attaining the desired end and while the structural features disclosed are preferably followed, attention is again invited to the possibility of making variations within the scope of the invention as claimed.

I claim:—

1. In an assemblage of the class described, a piston having a head, a skirt, and pin bosses; a connecting rod having a pin bearing between said pin bosses; a piston pin passing through said pin bearing and said pin bosses; two arms rigidly secured to the piston end of said rod and projecting in opposite directions therefrom at right angles to the pin axis, said arms having arcuate bearing surfaces on their outer ends, said bearing surfaces being concentric with the piston pin and converging toward the piston head; and bearing abutments rigidly secured to the piston and having arcuate bearing surfaces contacting with said arcuate bearing surfaces of said arms.

2. In an assemblage of the class described, a piston having a head, a skirt, and pin bosses; a connecting rod having a pin bearing between said pin bosses; a piston pin passing through said pin bearing and said pin bosses; two arms rigidly secured to the piston end of said rod and projecting in opposite directions therefrom at right angles to the pin axis, said arms having arcuate bearing surfaces on their outer ends, said bearing surfaces being concentric with the piston pin and converging toward the piston head; and bearing abutments rigidly secured to said piston head and skirt in the angle between said head and skirt, said abutments having arcuate bearing surfaces contacting with said arcuate bearing surfaces of said arms.

3. In an assemblage of the class described, a piston having a head, a skirt, and pin bosses; a connecting rod having a pin bearing between said bosses; a piston pin passing through said pin bearing and said pin bosses; two arms integrally joined to said pin bearing and projecting in opposite directions therefrom at right angles to the pin axis, said arms having arcuate bearing surfaces on their outer ends, said bearing surfaces being concentric with the piston pin and converging toward the piston head; and bearing abutments integrally joined to the piston head and skirt in the angle between said head and skirt, said abutments having arcuate bearing surfaces contacting with said arcuate bearing surfaces of said arms.

4. In a piston having a head, a skirt, and pin bosses; two bearing abutments rigidly secured to said piston, said abutments being disposed at opposite sides of the axis of said pin bosses, said abutments having arcuate bearing surfaces concentric with said pin bosses and converging toward the piston head, for the purpose set forth.

5. In a piston having a head, a skirt, and pin bosses; two bearing abutments integrally joined to the piston head and skirt in the angle between said head and skirt, said abutments being disposed at opposite sides of the axis of said pin bosses and having arcuate bearing surfaces concentric with said pin bosses and converging toward the piston head, for the purpose set forth.

RICHARD J. KRATKY.